United States Patent
Helms et al.

[15] 3,666,977
[45] May 30, 1972

[54] LINEAR POSITIONER

[72] Inventors: Clifford J. Helms, Calabasas Park; Stelios B. Papadopoulos, Westlake Village, both of Calif.

[73] Assignee: Sperry Rand Corporation, New York, N.Y.

[22] Filed: Sept. 10, 1970

[21] Appl. No.: 71,013

[52] U.S. Cl. ............................... 310/13, 310/27, 340/174.1
[51] Int. Cl. ........................................................... H02k 41/02
[58] Field of Search ........................ 310/12–14, 27, 310/266, 269; 179/115, 5 VC; 340/174.1

[56] References Cited

UNITED STATES PATENTS

| | | | |
|---|---|---|---|
| 3,505,544 | 4/1970 | Helms | 310/13 |
| 3,159,040 | 12/1964 | Thomas et al. | 340/174.1 X |
| 2,897,475 | 7/1959 | Harris | 179/115.5 X |
| 575,699 | 1/1897 | Chaplin et al. | 310/12 X |
| 506,124 | 10/1893 | Lewis | 310/12 |
| 3,176,170 | 3/1965 | Fulton et al. | 310/12 |
| 3,521,092 | 7/1970 | Kalthoff | 310/27 X |
| 3,488,837 | 1/1970 | Massouda et al. | 310/266 X |
| 3,241,006 | 3/1966 | Boyko | 310/134 X |

*Primary Examiner*—J. V. Truhe
*Assistant Examiner*—B. A. Reynolds
*Attorney*—English, Kapustin & Cleaver

[57] ABSTRACT

A linear positioner particularly useful for rapidly and precisely positioning heads with respect to a magnetic disc recording surface. The positioner includes a linear motor having a cylindrical core of magnetically permeable material and a motor housing, also of permeable material, closely magnetically coupled to the ends of the core. Permanent magnets are mounted on the inner surface of the housing, between the ends thereof, to produce a magnetic field across an air gap to the core which is of substantially uniform density along the length of the core. A coil assembly, including a rigid edge-wound drive coil mounted around the core in the air gap, is supported for horizontal movement along the core by a plurality of roller bearings. The roller bearings are mounted on bearing support rods secured to the drive coil structure and spaced around the circumference thereof. Some of the bearings are mounted for rotation about vertical spindle axes so as to engage vertical rail surfaces while other bearings are mounted for rotation about horizontal spindle axes so as to engage horizontal rail surfaces. At least some of the bearings are flexibly mounted in order to preload the bearings and assure that they roll properly on the rail surfaces.

13 Claims, 5 Drawing Figures

INVENTORS
CLIFFORD HELMS
STEVE POPODOPULOUS
BY
Lindenberg, Freilich & Wasserman
ATTORNEYS INVENTORS
CLIFFORD HELMS
STEVE POPODOPULOUS
BY
Lindenberg, Heilich + Wasserman
ATTORNEYS

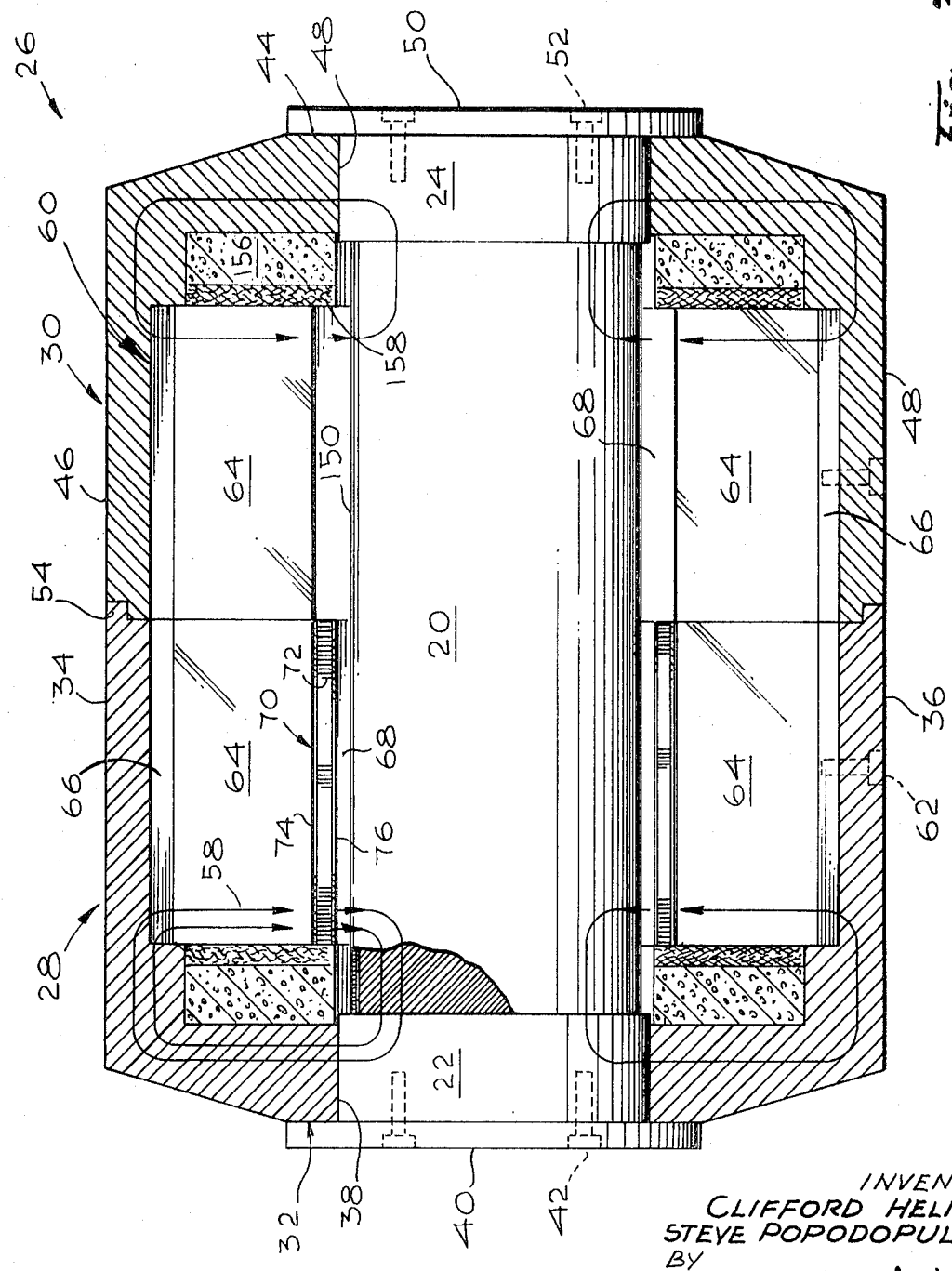

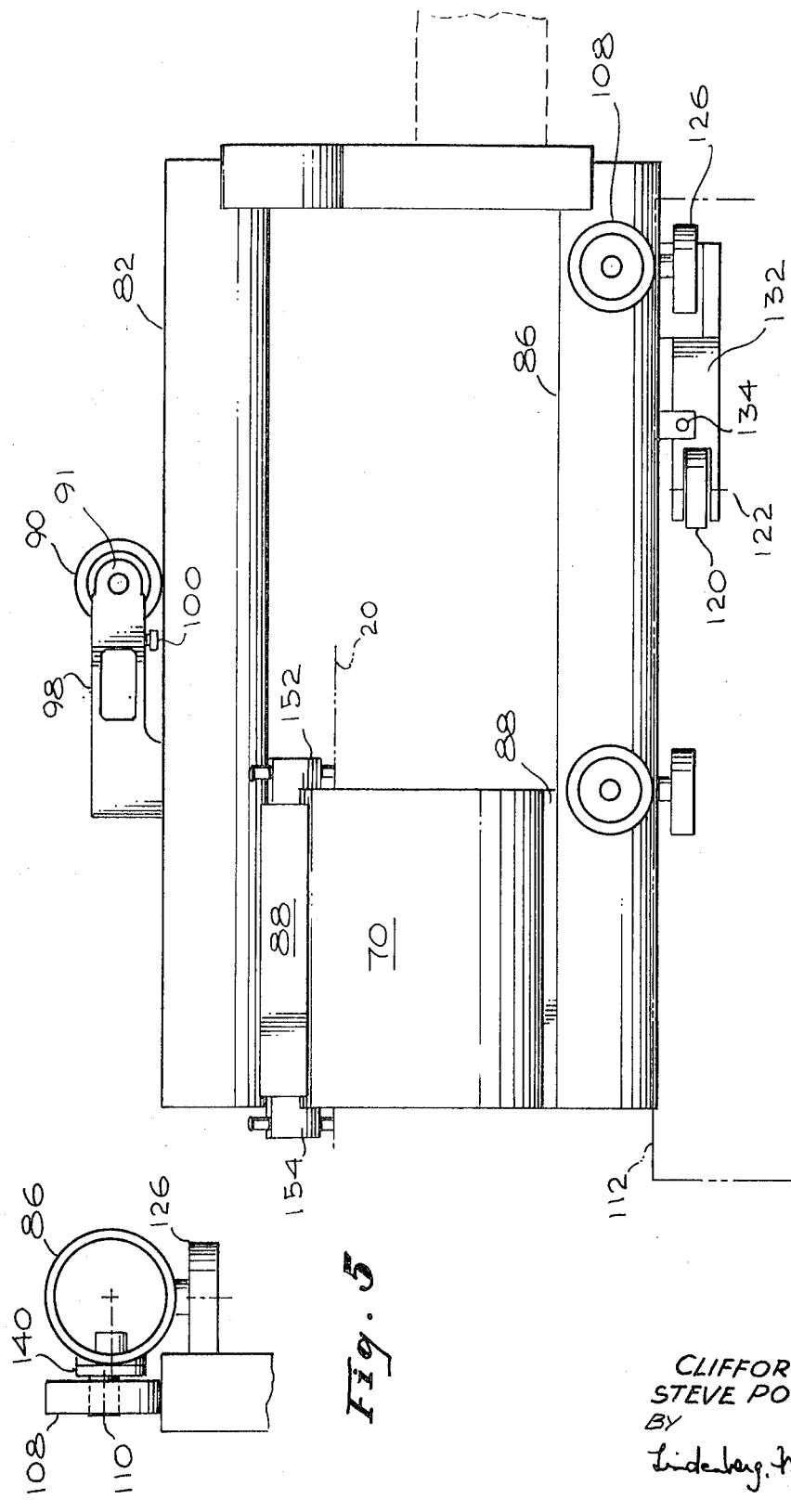

//3,666,977//

LINEAR POSITIONER

BACKGROUND OF THE INVENTION

The invention relates to improvements in the type of linear positioners generally disclosed in U.S. Pat. No. 3,505,544.

More particularly, the present invention relates to an improved linear positioner suitable for use in a magnetic disc memory. Such memories often employ magnetic discs which may have as many as 1,200 concentric tracks recorded on a surface having a 12 inch radius. In such memories, a head carrying arm is provided adjacent each disc surface. For the sake of economy, the arm may, for example, be provided with only four heads thereby requiring that it be able to incrementally radially move three inches with respect to the disc in order to position a head adjacent to a selected track. It will be appreciated that such applications require extremely accurate positioning resolutions. Moreover, inasmuch as the head positioning time constitutes a significant portion of the overall memory access time, it will also be appreciated that rapid positioning is extremely important. A further requirement of a linear positioner for practical use in a movable head disc memory system is that it have a relatively long stroke, e.g. more than one inch, in order to minimize the number of heads required per disc surface.

SUMMARY OF THE INVENTION

The present invention is directed to a linear positioner including a motor employing a central core of magnetically permeable material. The core is contained within a housing of permeable material shaped so as to be closely magnetically coupled to the core ends. Permanent magnets are mounted in the housing, between the ends thereof, to produce a magnetic field across an air gap to the core of substantially uniform intensity along the length of the core. A drive coil is provided which surrounds the core in the air gap.

In accordance with one important aspect of the present invention, the drive coil structure is precisely supported by a plurality of roller bearings which ride on the surfaces of fixedly mounted rails. The bearings include a first group oriented to ride along vertical rail surfaces and a second group oriented to ride along horizontal rail surfaces. The bearings are disposed so as to ride between opposed rail surfaces with one bearing in each group being flexibly mounted to preload the bearings and assure continued contact with the rail surfaces over the full stroke.

In accordance with the preferred embodiment of the invention, the bearings are attached to three bearing support rods secured to the circumference of the drive coil structure spaced apart by 120°. The rods are aligned with and project through elongated slots formed in the housing.

In accordance with another important aspect of the present invention, the drive coil structure is preferably formed by winding a conductor of rectangular cross-section on edge to yield a light rigid high-turn coil. In order to achieve even greater rigidity, the edge-wound coil is sandwiched between rigid thin wall cylindrical skins. A bucking coil, wound on the central core to reduce drive coil inductance, is preferably formed by edge-winding a conductor, having a thickness dimension similar to the drive coil conductor, so that both coils contain the same number of turns per unit length.

In accordance with another significant aspect of the preferred embodiment of the invention, the generation of stray fields is minimized as a consequence of the geometry employed.

The novel features of the invention are set forth with particularity in the appended claims. The invention will be best understood from the following description when read in conjunction with the accompanying drawings.

BRIEF DESCRIPTION OF THE DRAWINGS

FIG. 3 is a sectional view taken substantially along the plane 3—3 of FIG. 2;

FIG. 4 is a sectional view taken substantially along the plane 4—4 of FIG. 2; and FIG. 5 is an enlarged fragmentary view illustrating the eccentric mounting of one of the roller bearings spindle axes.

DESCRIPTION OF THE PREFERRED EMBODIMENTS

Figure 1:
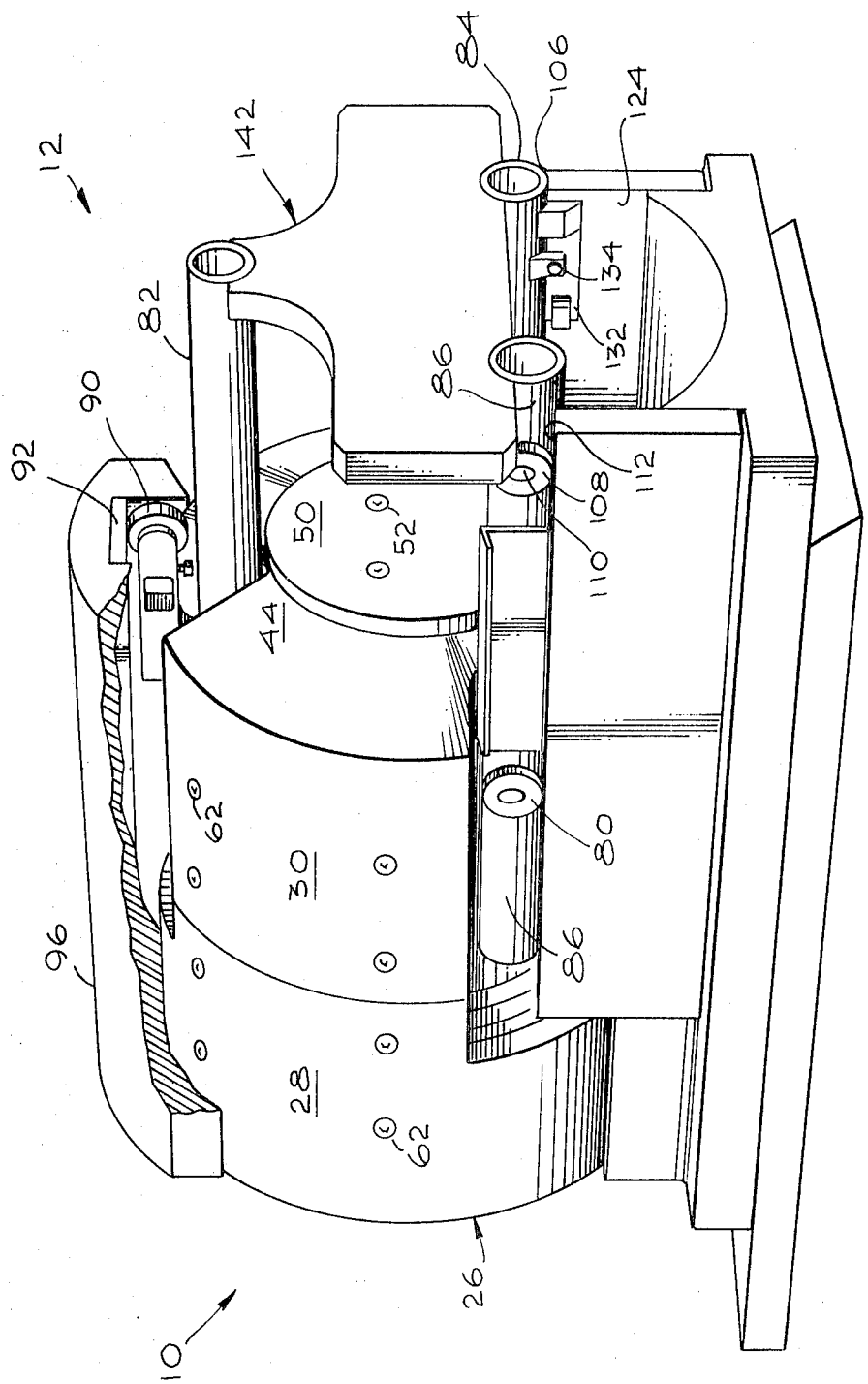
FIG. 1 is a perspective view of a preferred embodiment of a linear positioner in accordance with the present invention.

Attention is now called to FIG. 1 of the drawings which illustrates a perspective view of a preferred embodiment of linear positioner in accordance with the present invention. Briefly, the linear positioner embodiment of FIG. 1 can be considered as being comprised of two primary assemblies, i.e., the main frame assembly, essentially including the motor housing, permanent magnet structure and central core, and the carriage assembly essentially including the movable drive coil assembly and bearing and support means. The main frame assembly is generally represented by the numeral 10 in FIG. 1 and the carriage assembly, mounted for linear movement with respect to the main frame assembly, is generally represented by the numeral 12.

Figure 2:
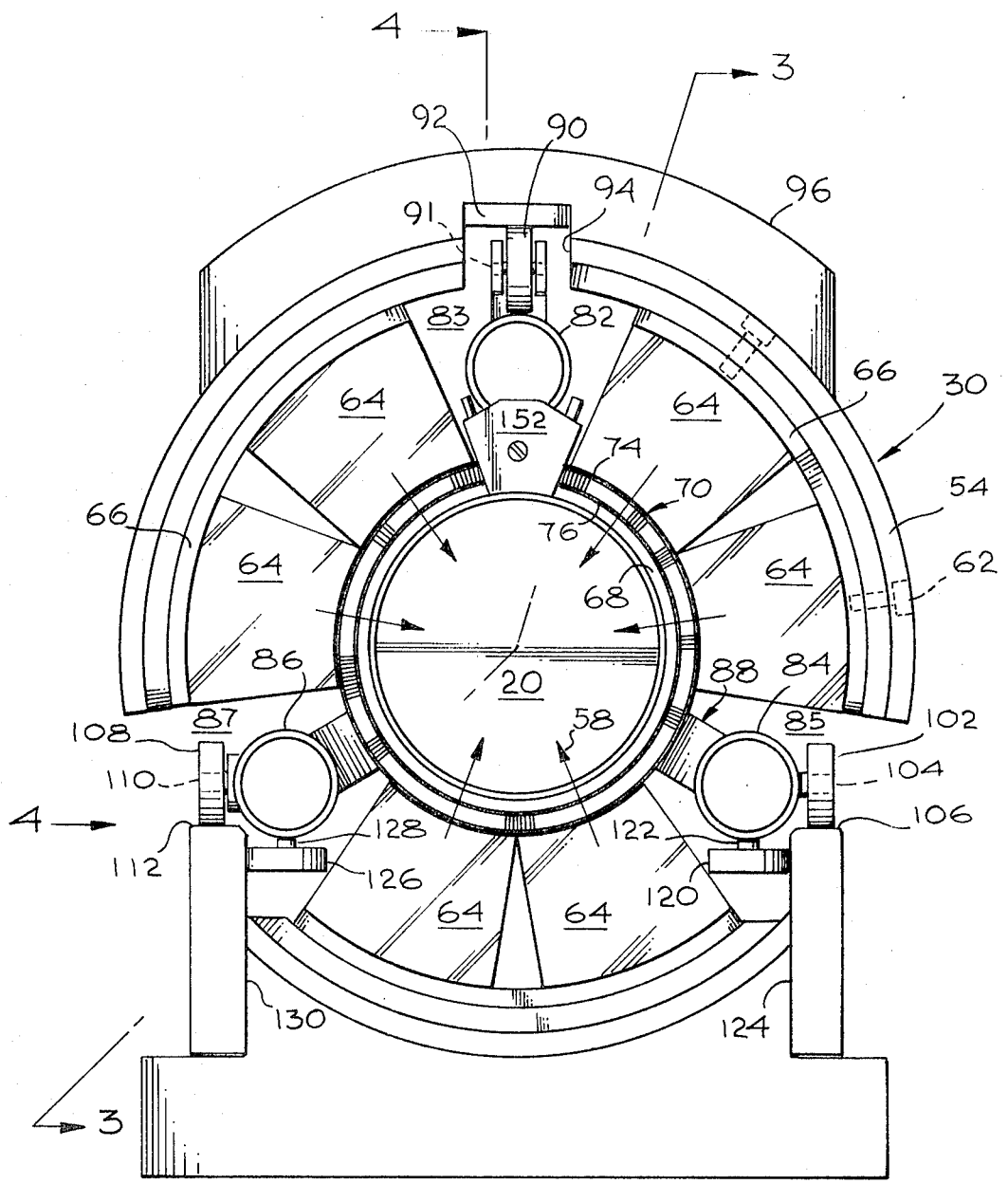
FIG. 2 is a vertical sectional view taken through the linear positioner of FIG. 1 along a plane perpendicular to the longitudinal axis thereof.

Attention is now called to FIGS. 2–4 which comprise sectional views illustrating the internal structural configuration of the linear positioner of FIG. 1. The main frame assembly includes a central core 20 formed of magnetically permeable material. The core 20 is substantially cylindrical and is enlarged at both ends 22 and 24. The core 20 extends along the axis of a substantially cylindrical housing 26 comprised of a rear cylindrical section 28 and a front cylindrical section 30. Both sections 28 and 30 are formed of magnetically permeable material and, as will be seen hereinafter, form part of the magnetic flux path for establishing a magnetic field across an air gap.

The rear housing section 28 is substantially U-shaped in cross-section having a bight portion 32 and forwardly projecting leg portions 34 and 36. A large opening 38 is formed in the bight portion 32 for receiving the enlarged end portion 22 of core 20. A plate 40 which is larger than the opening 38 is bolted to the core end 22 by bolts 42.

Similarly, the front housing section 30 is comprised of a bight portion 44 and rearward projecting leg portions 46 and 48. The bight portion 44 has an opening 48 extending therethrough for receiving the enlarged core end 24. A plate 50 larger than the opening 48 is bolted to the core end 24 by bolts 52. The opposed surfaces of the housing portions 28 and 30 are preferably provided with oppositely directed steps 54 which mate so as to effectively form a substantially continuous and rigid housing 26.

It will be noted that in FIGS. 3 and 4 the core end portions 22 and 24 are in contact with the housing in the openings 38 and 48 so as to form low reluctance paths between the core and housing at the core ends. On the other hand, the intermediate portions of the housing between the core ends 22 and 24 are spaced from the core. This spacing is provided so as to enable a permanent magnet structure to be secured between the housing and the core for producing a magnetic field across an air gap to the core. The permanent magnet structure is provided with a plurality of separate sections 60 each secured to the housing as by bolts 62. Each magnet section 60 is preferably comprised of a permanently magnetized block 64 of suitable material, such as Alnico 8, epoxied to a magnetically permeable support block 66. The bolts 62 extend through the housing wall into the support blocks 66.

As shown in FIGS. 2–4, the elements of the main frame assembly are so dimensioned that an air gap 68 is formed around the central core 20 between the core and the permanent magnet sections 60. The permanent magnet blocks 64 are magnetized radially, as shown in FIGS. 2 and 3, so as to produce a permanent magnetic field extending substantially perpendicularly across the air gap 68. As represented by the flux lines 58, the main frame assembly defines a magnetic path from the surface of the permanent magnetic blocks 64, through the air gap 68 and into the core 20, then longitudinally along the core to the core end, then through the bight and leg portions of the respective housing sections, and then through the support blocks 66 to return to the permanent magnetic blocks 64. It is pointed out that the permanent magnet structure is selected so that all of the flux across the air gap 68 is oriented in the same direction, i.e., either into or out of the core 20. As shown in FIGS. 2 and 3, it has been assumed herein that the magnet blocks 64 are magnetized so that the flux extends perpendicularly across the air gap 68 into the core 20. For proper performance of the illustrated linear positioner, it is important that the flux density be substantially uniform across the air gap 68 along the entire length of the magnet span, i.e., from near the core end 22 to near the core end 24.

Whereas the main frame assembly 10 thus far discussed is fixed in position and exhibits no motion, the carriage assembly 12 is mounted so as to exhibit linear motion with respect thereto. Motion is produced in response to an electromagnetic interaction between an electrical current through the drive coil of the carriage assembly and the permanent magnetic field produced by the magnet sections 60 across the air gap 68. More particularly, the carriage assembly 12 includes a multi-turn drive coil 70 which threads the air gap 68. In order to assure that the electromagnetic forces developed on the drive coil 70 are efficiently utilized to produce motion, it is important that the drive coil be made very rigid and light. In order to accomplish this, the drive coil 70 is preferably formed by edge-winding an aluminum conductor 72 having a substantially rectangular cross-section. The conductor 72 is of course insulated to prevent shorting between turns. To further increase rigidity, the drive coil 70 is sandwiched between inner and outer rigid thin-wall conductive skins 74 and 76.

The drive coil assembly, i.e., the drive coil 70 together with the skins 74 and 76, are supported for precise linear movement by a plurality of roller bearings 80 riding on the surfaces of steel rails. More particularly, in accordance with the preferred embodiment of the present invention, three elongated bearing support rods 82, 84 and 86 are secured to the drive coil assembly by short support members 88. In order to minimize weight in the carriage assembly, the support rods are preferably hollow and formed of light weight material such as aluminum or magnesium. The support rods 82, 84 and 86 respectively project through elongated slots 83, 85 and 87 formed in the front housing portion 30, spaced apart approximately 120° around the housing circumference and extending parallel to the common axis of the housing and core.

The support rods 82, 84 and 86 respectively carry roller bearings which ride along precisely defined rail surfaces for assuring that the drive coil assembly can move longitudinally through the air gap 68 without contacting either the core or magnetic blocks. The roller bearings are arranged so as to precisely position the drive coil assembly both vertically and horizontally.

More particularly, a bearing 90 is mounted on the rod 82 for rotation about a spindle axis 91 extending in a horizontal plane perpendicular to the axis of core 20. The bearing 90 is adapted to roll along the surface of a rail 92 secured in a recess 94 in a hood 96 secured to the housing 30 over the slot 83. It is pointed out that the spindle 91 is mounted at the free end of a cantilevered arm 98 secured to the bearing support rod 82. The cantilevered arm 98 is somewhat flexible so as to permit limited movement of the spindle 91 toward and away from the rod 82. More particularly, dimensions are selected so that the surface of rail 92 bears downwardly on the bearing 90 so as to apply a downward preload force of, for example, 10 pounds. A bolt 100 is threaded into the undersurface of the cantilevered arm 98 to act as an adjustable stop to limit the amount of preloading. That is, when the surface of rail 92 applies the desired preloading force to the bearing 90, the bolt 100 contacts the support rod 82 and any additional downward force is thereafter borne by the bolt 100 rather than the bearing 90.

Each of the bearing support rods 84 and 86 carry front and rear roller bearings mounted for rotation about horizontally oriented spindles, for rolling along a horizontal oriented rail surface. More particularly, as shown in FIG. 2, a roller bearing 102 is mounted for rotation around horizontally oriented spindle 104 supported by rod 84. Bearing 102 engages rail surface 106. Similarly, bearing 108 is mounted for rotation about horizontally oriented spindle axis 110 supported by rod 86. The bearing 108 rolls on rail surface 112.

It should be appreciated that the preloading force exerted by the rail surface 92 on the bearing 90 carried on the cantilevered arm 98 assures contact of the vertically oriented bearing 90, 102 and 108 against their respective rail surfaces over the entire stroke length. In order to assure proper horizontal positioning of the drive coil assembly, horizontally oriented roller bearings are carried by the support rods 84 and 86 for rolling against vertical rail surfaces.

More particularly, each of the bearing support rods 84 and 86 carries front and rear roller bearings rotatable about vertical spindles secured to the support rods. Thus, as shown in FIG. 2, rod 84 carries horizontally oriented roller bearing 120 mounted for rotation about vertically oriented spindle axis 122. Bearing 120 contacts and rides along the inner rail surface 124. Similarly, rod 86 carries horizontally oriented roller bearing 126 rotatable about vertically oriented spindle axis 128. Bearing 126 contacts and rides along vertical rail surface 130.

As with the vertically oriented bearing 90, one of the horizontally oriented bearings, bearing 120 in FIG. 2, is mounted on the end of a cantilevered arm to provide preloading in a horizontal direction. That is, spindle 122 is mounted at the free end of cantilevered arm 132 which is able to flex so that the spindle can slightly move toward and away from the rail surface 124. A stop 134 is provided to limit the amount of preloading transferred to the bearings.

It will be appreciated that the rail surfaces 106 and 112 lie in a common horizontal plane. The front and rear vertically oriented bearings supported by rod 86 are of course intended to ride along and remain in contact with the rail surface 112 along the entire stroke length. Similarly, the front and rear bearings supported by rod 84 are intended to ride along and remain in contact with rail surface 106 along the entire stroke length. To assure that all four vertically oriented bearings carried by rods 84 and 86 roll along the same plane in contact with the horizontal rail surfaces, the spindle of one of the vertically oriented bearings, e.g., bearing 110 (see FIG. 5) is made adjustable. More particularly, as shown in FIG. 5, the spindle 110 is eccentrically mounted on a small hexagonal plate 140 mounted on rod 86 for rotation about the central axis of the plate 140. By rotating the hexagonal plate 140, the vertical position of the horizontal plane through the spindle 110 is varied. This enables the spindle 110 to be moved into the plane defined by the other three vertically oriented roller bearings and assures that all four bearings will roll in contact with the rail surfaces.

A yoke assembly 142 is connected to the front end of the bearing support rods 82, 84 and 86. The yoke assembly preferably comprises a hollow lightweight shell formed of aluminum or magnesium, for example. The magnetic head assembly (not shown) is ultimately fastened to the yoke assembly and stiffening members are incorporated within the yoke assembly shell, as required.

From the foregoing, the significant structural aspects of the preferred embodiment of the invention should now be appreciated. In operation, when it is desired to impart linear motion to the carriage assembly, an electrical current is driven through the drive coil which, as a consequence of the permanent magnetic field through the air gap produces a force on the drive coil extending parallel to the core axis. In order to cause the carriage assembly to come to rest at a desired position, a suitable servo system (not shown) is employed to compare the actual carriage assembly position with the desired position. The error signal of course controls the drive coil energization.

As mentioned in the aforecited U.S. Pat. No. 3,505,544, in order to assure rapid movement of the drive coil and minimize the external drive coil field, it is advantageous to reduce the drive coil inductance, as by connecting a bucking coil in series with the drive coil but orienting it on the core so as to produce a magnetic field therein opposite to that produced by the drive coil. Accordingly, the positioner of the present invention incorporates a bucking coil 150 tightly wound around the core 20. It will be recognized that the number of bucking coil turns and the number of drive coil turns connected in series should preferably be the same in order to minimize inductance and they should preferably act on identical portions of the core. The total length of the drive coil structure is only about half the length of the core in order, of course, to provide stroke length. For example, the length of the central portion of the core may be about 7 inches and the length of the drive coil structure about 3 and ½ inches thus enabling the carriage assembly to exhibit a maximum linear movement of about 3 and ½ inches. In order to assure that the number of bucking coil turns is the same as the number of drive coil turns and that they act on the same portion of the core, the bucking coil extends along the full length of the core central portion and spaced brushes 152, 154 are provided, carried by the drive coil assembly, which energize only that portion of the bucking coil between the brushes. The energized portion of the bucking coil is connected in series with the drive coil. The bucking coil 150 is preferably formed by an edge wound rectangular cross-section conductor dimensioned substantially the same as the drive coil to achieve the same number of turns per unit length.

In order to prevent damage to the drive coil assembly and possibly other parts of the positioner in the event of failure of the servo system, resilient bumpers are included in the housing. More particularly, as is best shown in FIG. 3, foam rubber material 156 is inserted at both ends of the housing. A sheet of plastic material 158 is preferably disposed adjacent to the foam rubber material to prevent the drive coil assembly from cutting the foam rubber.

Although particular embodiments of the invention have been described and illustrated herein, it is recognized that modifications and variations may readily occur to those skilled in the art and, consequently, it is intended that the claims be interpreted to cover such modifications and equivalents.

We claim:

1. A linear motor comprising:
   a substantially cylindrical core of magnetically permeable material;
   a substantially cylindrical housing of magnetically permeable material mounted with the axis thereof coincident with the axis of said core, said housing including end portions formed to provide a low reluctance path to the ends of said core and an intermediate portion spaced from an intermediate portion of said core;
   a permanent magnet structure mounted within said housing adjacent to said intermediate portion thereof and spaced from said core to define an air gap therebetween, said permanent magnet structure being oriented so as to direct magnetic flux in a uniform direction substantially perpendicularly across said air gap;
   a rigid substantially shaped drive coil assembly;
   said housing including three elongated slots spaced by substantially 120° around the circumference thereof, each extending parallel to said core axis;
   a plurality of roller bearings secured to said drive coil assembly in alignment with said slots for rotation about spindle axes extending substantially perpendicular to planes through said core axis; and
   three fixedly mounted rails defining perpendicularly related reference surfaces, each reference surface engaging at least one of said roller bearings for supporting said coil assembly in said air gap out of engagement with said core and permanent magnet structure.

2. The motor of claim 1 wherein said drive coil assembly includes a first conductor having a substantially rectangular cross-section and wound on edge to form a cylindrical multi-turn drive coil.

3. The motor of claim 2 wherein said drive coil assembly includes rigid thin wall, cylindrical skins adhered to the inner and outer surfaces of said cylindrical drive coil.

4. The motor of claim 2 including a second conductor having a substantially rectangular cross-section and wound on edge on said core to form a cylindrical multi-turn bucking coil;
   said bucking coil having a greater number of turns than said drive coil; and
   first and second spaced means carried by said coil structure electrically contacting said bucking coil across a portion including a number of turns substantially equal to the number of turns in said drive coil for connecting said bucking coil portion in series of opposition to said drive coil.

5. The motor of claim 1 including three bearing support rods extending parallel to said core axis and secured to said drive coil assembly substantially 120° apart; and wherein
   said plurality of roller bearings includes three sets of roller bearings, each set being mounted on a different one of said bearing support rods.

6. The motor of claim 5 wherein at least one of said sets of bearings includes first and second bearings mounted for rotation about first and second spindle axes extending perpendicular to one another.

7. The motor of claim 6 wherein at least one of said rails includes first and second perpendicular surfaces respectively engaging such first and second bearings.

8. The motor of claim 1 wherein said plurality of bearings includes a first group rotatable about spindle axes extending in a first direction perpendicular to a plane through said core axis and a second group rotatable about spindle axes extending in a second direction perpendicular to both said first direction and to a plane through said core axis.

9. The motor of claim 8 wherein said plurality of rails defines at least first and second spaced surfaces extending parallel to said first direction each engaging bearings in said first group disposed therebetween and third and fourth spaced surfaces extending parallel to said second direction each engaging bearings in said second group disposed therebetween.

10. The motor of claim 9 including means flexibly mounting at least one bearing in each of said first and second groups for respectively resiliently urging said flexibly mounted bearings against rail surfaces extending in said first and second directions.

11. The motor of claim 10 including adjustable stop means mounted adjacent each of said flexibly mounted bearings for limiting the amount of flexure thereof.

12. The motor of claim 1 including means for adjusting the position of one of said spindle axes.

13. The motor of claim 1 including energy absorbing bumper means secured in said housing adjacent to the end portions thereof in alignment with said drive coil assembly.

* * * * *